United States Patent [19]
Wilkinson

[11] Patent Number: 5,754,239
[45] Date of Patent: May 19, 1998

[54] MOTION COMPENSATED VIDEO PROCESSING

[75] Inventor: James Hedley Wilkinson, England, United Kingdom

[73] Assignees: Sony Corporation, Tokyo, Japan; Sony United Kingdom Limited, Weybridge, England

[21] Appl. No.: 658,592

[22] Filed: Jun. 5, 1996

[30] Foreign Application Priority Data

Jun. 6, 1995 [GB] United Kingdom ............... 9511405

[51] Int. Cl.$^6$ ............... H04N 7/12; H04N 11/02; H04N 11/04
[52] U.S. Cl. ............... 348/415; 348/411; 382/232
[58] Field of Search ............... 348/411, 413, 348/700, 401, 402, 412, 415, 416, 423; 382/232, 236

[56] References Cited

U.S. PATENT DOCUMENTS

| | | | |
|---|---|---|---|
| 5,113,255 | 5/1992 | Nagata et al. | 358/136 |
| 5,132,792 | 7/1992 | Yonemitsu et al. | 358/136 |
| 5,231,484 | 7/1993 | Gonzales et al. | 358/133 |
| 5,305,113 | 4/1994 | Iwamura et al. | 358/132 |
| 5,319,468 | 6/1994 | Honjo | 348/415 |

FOREIGN PATENT DOCUMENTS

| | | |
|---|---|---|
| 0395440 A2 | 10/1990 | European Pat. Off. |
| 0584840 A2 | 3/1994 | European Pat. Off. |
| 0593099 A1 | 4/1994 | European Pat. Off. |

OTHER PUBLICATIONS

The Coding Technique of Motion Pictures For Storage Media, Television Acadamic Journal, vol. 45, No. 7, pp. 807–812 (1991) by Yamada Yasuhiro and Ueda, Motoharu, 1991.

*Primary Examiner*—Tommy P. Chin
*Assistant Examiner*—Nhon T. Diep
*Attorney, Agent, or Firm*—Frommer Lawrence & Haug LLP; William S. Frommer

[57] ABSTRACT

A motion compensated video processing method includes encoding a video frame group $I_0$–$I_7$ into one in which one frame $I_0$ of the group is a basic input frame or 'I' frame, and the other frames $B_1$–$B_7$ are derived from calculating the difference between a current frame and two neighboring frames so as to form 'B' frames. The 'B' frames are derived in a logarithmic progression. The 'B' frames are quantized by applying selective quantization weighting to predetermined input frames. Encoding can be of the forms described as open loop or closed loop, preferably open loop. Decoding can be achieved by applying inverse quantization weighting to the input frames prior to selective summation in order to achieve a constant reconstruction error for each frame even though quantization errors carry over from each reconstruction stage.

6 Claims, 4 Drawing Sheets

MOTION COMPENSATED VIDEO PROCESSING

BACKGROUND OF THE INVENTION

1. Field of the Invention

This invention relates to motion compensated video processing methods and apparatus.

2. Description of the Prior Art

It is known to use motion compensated predictive coding in video processing so as to compress the data required for coding. One such digital compression standard, known as MPEG1, was set by the Motion Picture Experts Group (MPEG) of the International Standards Organisation (ISO). A further developed standard is known as MPEG2. This standard makes use of (i) forward prediction from past to current frames of a video signal, and (ii) bidirectional prediction from past to current frames, and from future to current frames.

Standard MPEG coding uses a convention of designating frames as either 'I', 'B' or 'P' frames. An 'I' frame is a picture coded as a single frame, whereas a 'P' frame is the output of a predicted frame difference, and a 'B' frame is the difference between a current frame and the average of two frames either side (Bi-directional). The convention is now well understood and documented, for example in ISO/IEC 11172-2:1993(E) "Information Technology—Coding of Moving Pictures and Associated Audio for Digital Storage Media at up to about 1.5 Mbit/s".

Early forms of MPEGI used only forward prediction using an initial 'I' frame followed by a number of 'P' frames as follows:

I P P P . . . P I

Later versions of MPEG1 as well as MPEG2 use all three types, typically in a 12 frame sequence (for 50 Hz applications) as follows:

I B B P B B P B B P B B I

In each method, motion vectors are applied to minimize the prediction error and improve coding efficiency.

Although the MPEG standards provide an effective degree of compression, there is a need for systems and methods allowing still greater compression in video processing.

SUMMARY OF THE INVENTION

It is an object of the invention to provide a motion compensated video processing method which allows a greater degree of compression than previously-proposed methods.

It is another object of the invention to provide a motion compensated video processing method which allows a simple open-loop encoding technique to be utilized.

According to one aspect of the invention there is provided a motion compensated video processing method comprising encoding a video frame group into one of 2" frames in which one frame of the encoded group is a basic input frame and the or each other frame is derived from calculating the difference between a current frame and two neighbouring frames on either side.

According to another aspect of the invention there is provided a motion compensated video processing method comprising encoding a video frame group into one having an 'I' frame, the or each other frame being a 'B' frame.

A preferred embodiment of the invention utilizes a temporal decimation method to effect video compression in which a sequence or group of video frames, otherwise known as a group of pictures (GOP), such as 2, 4, 8, 16, 32 (etc.) frames, is decomposed into one still frame and the remaining frames as difference frames. The method is referred to as logarithmic temporal decimation. The method uses only 'I' and 'B' frames, in which an 'I' frame can be considered to be a normal frame, and a 'B' frame can be considered to be the result of calculating the difference between a current frame and two neighbouring frames on either side. Motion vectors are normally used to assist the creation of 'B' frames. The method creates only 'B' frames as the result of applying a progressive structure in both encoding and decoding. The 'B' frames are quantized by applying selective quantization weighting to predetermined input frames. Decoding can be achieved by applying inverse quantization weighting to the input frames prior to selective summation in order to achieve a constant reconstruction error for each frame even though quantization errors carry over from each reconstruction stage. The method achieves better results than either MPEG1 or MPEG2 coding. Further, use of this form of compression enables the use of a simpler open-loop encoding technique giving better visual results.

The above, and other objects, features and advantages of this invention will be apparent from the following detailed description of illustrative embodiments which is to be read in connection with the accompanying drawings.

DESCRIPTION OF THE PREFERRED EMBODIMENTS

The 'B' frame octave structure embodying the invention will now be described.

The number of frames between the 'I' frames is a power of 2; i.e. 2, 4, 8, 16 etc. A 2-frame sequence is the trivial case as follows:

$I_0\ B_1\ I_2\ B_3\ I_4\ B_5\ I_6\ B_7\ I_8$ etc.

Each 'B' frame is predicted from the 'I' frames either side, with or without motion vector compensation. This is an efficient coding technique, but the number of 'I' frames is half the total frame count, thereby limiting coding efficiency.

The next step is to replace every other 'I' frame ($I_2$ and $I_6$) by a corresponding predicted 'B' frame from above as follows:

$I_0\ B_1\ B_2\ B_3\ I_4\ B_5\ B_6\ B_7\ I_8$ etc.

Frame $B_2$ has been created by the difference:
$$I_2-(I_0+I_4)/2,$$
and frame $B_6$ from the difference:
$$I_6-(I_4+I_8)/2.$$

This gives a 4-frame sequence in two stages. The efficiency is quite good, but there is further advantage to be gained in coding $I_4$ into a 'B' frame using a prediction from frames $I_0$ and $I_8$ as follows:

$$B_4=I_4-(I_0+I_8)/2$$

This leads to the sequence:

$$I_0 \; B_1 \; B_2 \; B_3 \; B_4 \; B_5 \; B_6 \; B_7 \; I_8 \text{ etc.}$$

The process can be continued indefinitely with the 'I' frames being spaced by twice the temporal distance at each stage. However, the coding efficiency rapidly approaches an asymptotic limit which is almost reached with a 3-level decimation and further decimation is not normally necessary.

It is also the case that coding delays increase with higher levels of decimation and such delays may introduce operational problems. The memory requirements also increase with higher decimation levels so the incentive is to use as few levels of temporal decimation as possible commensurate with desired picture quality. In most experiments, even for the highest compression ratios, 3 stages of temporal decimation have proven sufficient.

Figure 1:
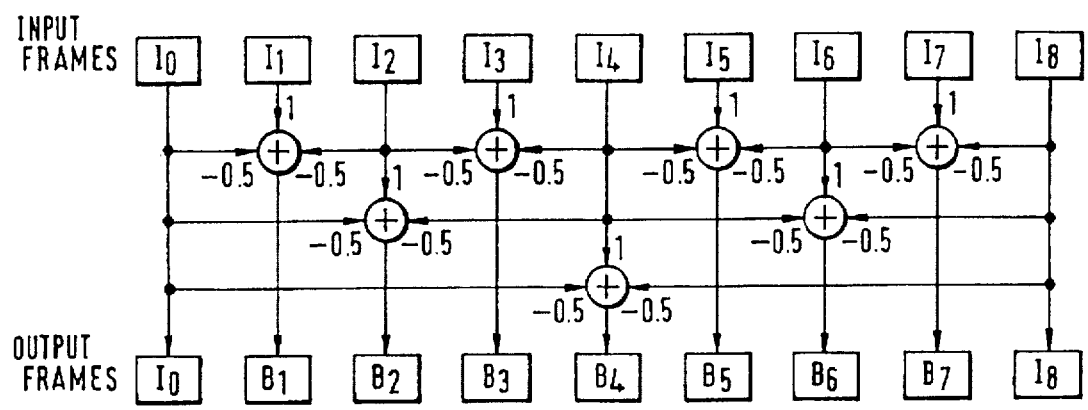
FIG. 1 shows a schematic of a logarithmic temporal decimation structure according to an embodiment of the invention.

FIG. 1 shows the 3-level, 8-frame logarithmic decimation process in diagrammatic form. Note that although shown as a simple arithmetic process, at each stage, new 'B' frames are created from surrounding 'I' frames with the addition of motion vector compensation in order to minimize the 'B' frame errors.

The motion vectors are related to adjacent frames for the generation of $B_1$, $B_3$, $B_5$ and $B_7$. For the generation of frames $B_2$ and $B_6$ the motion vectors are generated from 2-frames distant. And for the generation of frame $B_4$, the motion vectors are generated from 4-frames distant (i.e., from frame $I_0$ and $I_8$). This means that the motion vector range must increase by a power of 2 for each stage in the logarithmic decimation process.

Figure 2:
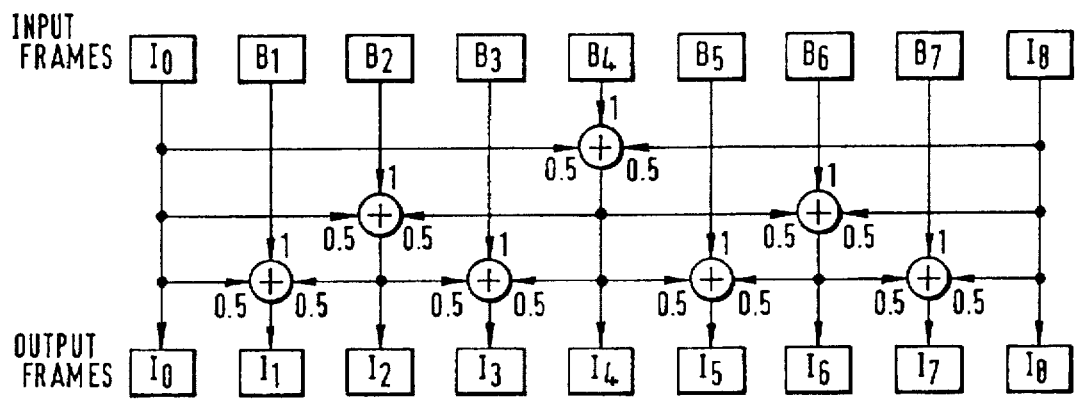
FIG. 2 shows a logarithmic temporal interpolation structure which can be used to decode the frame sequence provided in FIG. 1.

The decoding process is shown in FIG. 2.

For the 8-frame sequence shown as an example, the decoder must regenerate the frames in a particular sequence for the following reason. Take, for example, frame 1. Its reconstruction depends on having frames $I_0$ and $I_2$. But frame $I_2$ must be reconstructed from frames $I_0$ and $I_4$; and $I_4$ must be reconstructed from frames $I_0$ and $I_8$. The decoder must, therefore, reconstruct the frames in a particular order as follows:

From frames $I_0$ and $I_8$:
$$I_4=B_4+(I_0+I_8)/2$$
From frames $I_0$, $I_4$ and $I_8$:
$$I_2=B_2+(I_0+I_4)/2$$
$$I_6=B_6+(I_4+I_8)/2$$

From frames $I_0$, $I_2$, $I_4$, $I_6$ and $I_8$:
$$I_1=B_1+(I_0+I_2)/2$$
$$I_3=B_1+(I_2+I_4)/2$$
$$I_5=B_1+(I_4+I_6)/2$$
$$I_7=B_1+(I_6+I_8)/2$$

Although the decoder must reconstruct the frames in a particular order, the general encoder could encode in any sequence except in the following circumstance in which the aim is to minimize error propagation during encoding.

The classic DPCM coding process encompasses a decoder within the encoder forming a loop in order to prevent recursive errors. The same problem occurs in both 'P' and 'B' differential frame coders, so MPEG arranges to overcome this by the loop shown in FIG. 3 which illustrates a basic temporal coding process of closed loop type.

Figure 3:
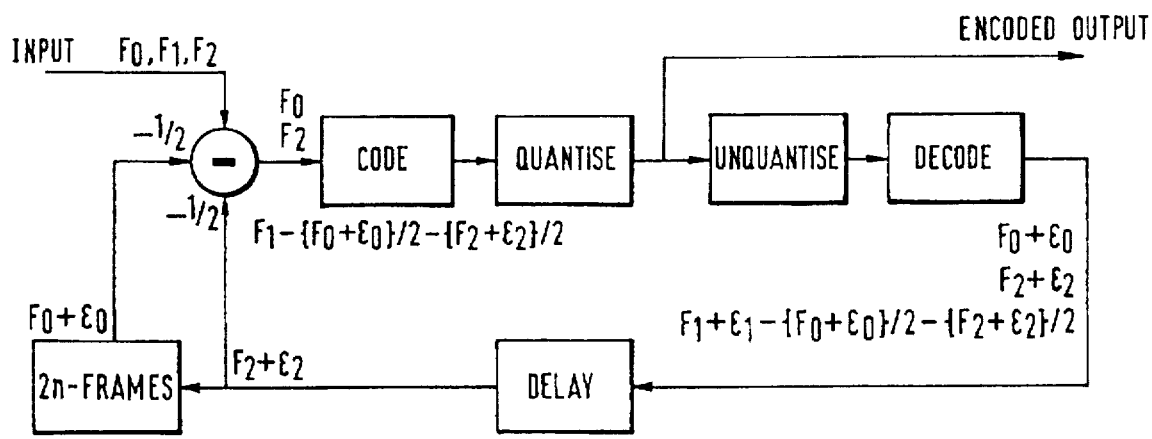
FIG. 3 shows a basic temporal coding process of closed-loop type.

Referring to FIG. 3, the I frames $F_0$ and $F_2$ are processed first, resulting in reproduced frames $F_0+\epsilon_0$ and $F_2+\epsilon_2$ respectively. These frames have errors introduced by the quantization process. The average of the two frames is subtracted from frame $F_1$ to produce the difference frame $B_1$. This is coded thus producing its own error to be added to the original signal.

Noting that the receiver also produces frames $F_0+\epsilon_0$ and $F_2+\epsilon_2$, then the reconstruction of frame $F_1$ cancels the error propagation leaving $F_1+\epsilon_1$. Thus, although the encoder is more complex, the errors introduced by each frame are local to that frame. However, it should also be noted that the noise introduced by the prediction from the reconstructed frames, $F_0+\epsilon_0$ and $F_2+\epsilon_2$, introduces an imperfect prediction match which can worsen the 'B' frame prediction.

Consider, now, the problem which would occur if such feedback were not used in an I-P based system such as MPEG1. The 'I' frame is coded as normal. The 'P' frames are created from the original pictures without reconstruction errors.

In the transmitter, the encoded frames are as follows:

| Start Frame | Encoded Frame | Decoded Frame |
|---|---|---|
| $I_0$ | $I_0$ | $I_0 + \epsilon_0$ |
| $I_1$ | $P_1 = I_1 - I_0$ | $P_1 + \epsilon_1$ |
| $I_2$ | $P_2 = I_2 - I_1$ | $P_2 + \epsilon_2$ |
| $I_3$ | $P_3 = I_3 - I_2$ | $P_3 + \epsilon_3$ |
| $I_4$ | $P_4 = I_4 - I_3$ | $P_4 + \epsilon_4$ |
| ... etc. | | |

The receiver recreates frames as follows:

| Input | Decoded Frame (a) | Decoded Frame (b) |
|---|---|---|
| $I_0 + \epsilon_0$ | $I_0 + \epsilon_0$ | $I_0 + \epsilon_0$ |
| $P_1 + \epsilon_1$ | $I_1' = P_1 + \epsilon_1 + I_0 + \epsilon_0$ | $I_1 + \epsilon_1 + \epsilon_0$ |
| $P_2 + \epsilon_2$ | $I_2' = P_2 + \epsilon_2 + P_1 + \epsilon_1 + I_0 + \epsilon_0$ | $I_2 + \epsilon_2 + \epsilon_1 + \epsilon_0$ |
| $P_3 + \epsilon_3$ | $I_3' = P_3 + \epsilon_3 + P_2 + \epsilon_2 + P_1 + \epsilon_1 + I_0 + \epsilon_0$ | $I_3 + \epsilon_3 + \epsilon_2 + \epsilon_1 + \epsilon_0$ |
| $P_4 + \epsilon_4$ | $I_4' = P_4 + \epsilon_4 + P_3 + \epsilon_3 + P_2 + \epsilon_2 + P_1 + \epsilon_1 + I_0 + \epsilon_0$ $I_4 + \epsilon_4 + \epsilon_3 + \epsilon_2 + \epsilon_1 + \epsilon_0$ | $I_4 + \epsilon_4 + \epsilon_3 + \epsilon_2 + \epsilon_1 + \epsilon_0$ |
| ... etc. | | |

The recursive nature of the decoder is such that the picture is rebuilt from all preceding frames from the 'I' start frame. This also applies to the errors created by each 'P' frame causing a build up of errors in the decoder. Hence it is necessary to create a decoder in the encoder loop to prevent such a recursive build up.

However, the nature of the recursion is quite different for a logarithmic 'B' frame coding system as described above. Assuming that the encoding operation is performed without the feedback loop, the encoder would produce a sequence of frames as follows for a 3-level temporal decimation (8 frames):

| Start Frame | Encoded Frame | Decoded Frame |
|---|---|---|
| $I_0$ | $I_0$ | $I_0 + \epsilon_0$ |
| $I_8$ | $I_8$ | $I_8 + \epsilon_8$ |
| $I_4$ | $B_4 = I_4 - (I_0 + I_8)/2$ | $B_4 + \epsilon_4$ |
| $I_2$ | $B_2 = I_2 - (I_0 + I_4)/2$ | $B_2 + \epsilon_2$ |
| $I_6$ | $B_6 = I_6 - (I_4 + I_8)/2$ | $B_6 + \epsilon_6$ |
| $I_1$ | $B_1 = I_1 - (I_0 + I_2)/2$ | $B_1 + \epsilon_1$ |
| $I_3$ | $B_3 = I_3 - (I_2 + I_4)/2$ | $B_3 + \epsilon_3$ |
| $I_5$ | $B_5 = I_5 - (I_4 + I_6)/2$ | $B_5 + \epsilon_5$ |
| $I_7$ | $B_7 = I_7 - (I_6 + I_8)/2$ | $B_7 + \epsilon_7$ |

As stated previously, the order of 'B' frame generation is not important at the encoder since there is independence between the generation of each frame. But, the decoder must recreate the 'I' frames in the following defined order:

| Decoded Frame | Decoded Frame – With Expanded Error Terms |
|---|---|
| $I_0'$ | $= I_0 + \epsilon_0$ |
| $I_8'$ | $= I_8 + \epsilon_8$ |
| $I_4' = B_4 + \epsilon_4 + (I_0' + I_8')/2$ | $= I_4 + \epsilon_4 + \epsilon_0/2 + \epsilon_8/2$ |
| $I_2' = B_2 + \epsilon_2 + (I_0' + I_4')/2 = I_2 + \epsilon_2 + \epsilon_0/2 + (\epsilon_4 + \epsilon_0/2 + \epsilon_8/2)/2$ | |
| | $= I_2 + \epsilon_2 + 3*\epsilon_0/4 + \epsilon_4/2 + 3*\epsilon_8/4$ |
| $I_6' = B_6 + \epsilon_6 + (I_4' + I_8')/2 = I_6 + \epsilon_6 + (\epsilon_4 + \epsilon_0/2 + \epsilon_8/2)/2 + \epsilon_8/2$ | |
| | $= I_6 + \epsilon_6 + \epsilon_0/4 + \epsilon_4/2 + 3*\epsilon_8/4$ |
| $I_1' = B_1 + \epsilon_1 + (I_0' + I_2')/2 = I_1 + \epsilon_1 + \epsilon_0/2 + (\epsilon_2 + 3*\epsilon_0/4 + \epsilon_4/2 + \epsilon_8/4)/2$ | |
| | $= I_1 + \epsilon_1 + 7*\epsilon_0/8 + \epsilon_2/2 + \epsilon_4/4 + \epsilon_8/8$ |
| $I_3' = B_3 + \epsilon_3 + (I_2' + I_4')/2 = I_3 + \epsilon_3 + (\epsilon_2 + 3*\epsilon_0/4 + \epsilon_4/2 + \epsilon_8/4)/2 + (\epsilon_4 + \epsilon_0/2 + \epsilon_8/2)/2$ | |
| | $= I_3 + \epsilon_3 + 5*\epsilon_0/8 + \epsilon_2/2 + 3*\epsilon_4/4 + 3*\epsilon_8/8$ |
| $I_5' = B_5 + \epsilon_5 + (I_4' + I_6')/2 = I_5 + \epsilon_5 + (\epsilon_4 + \epsilon_0/2 + \epsilon_8/2)/2 + (\epsilon_6 + \epsilon_0/4 + \epsilon_4/2 + 3*\epsilon_8/4)/2$ | |
| | $= I_5 + \epsilon_5 + 3*\epsilon_0/8 + 3*\epsilon_4/4 + \epsilon_6/2 + 5*\epsilon_8/8$ |
| $I_7' = B_7 + \epsilon_7 + (I_6' + I_8')/2 = I_7 + \epsilon_7 + (\epsilon_6 + \epsilon_0/4 + \epsilon_4/2 + 3*\epsilon_8/4)/2 + \epsilon_8/2$ | |
| | $= I_7 + \epsilon_7 + \epsilon_0/8 + \epsilon_4/4 + \epsilon_6/2 + 7*\epsilon_8/8$ |

Now the error components are almost entirely noise and uncorrelated, hence the noise power for each frame is given as the sum of each error squared, i.e.:

| Frame | Noise Power |
|---|---|
| 0: | $E_0^2 = (\epsilon_0)^2$ |
| 8: | $E_8^2 = (\epsilon_8)^2$ |
| 4: | $E_4^2 = (\epsilon_4)^2 + (\epsilon_0/2)^2 + (\epsilon_8/2)^2$ |
| 2: | $E_2^2 = (\epsilon_2)^2 + (3*\epsilon_0/4)^2 + (\epsilon_4/2)^2 + (\epsilon_8/4)^2$ |
| 6: | $E_6^2 = (\epsilon_6)^2 + (\epsilon_0/4)^2 + (\epsilon_4/2)^2 + (3*\epsilon_8/4)^2$ |
| 1: | $E_1^2 = (\epsilon_1)^2 + (7*\epsilon_0/8)^2 + (\epsilon_2/2)^2 + (\epsilon_4/4)^2 + (\epsilon_8/8)^2$ |
| 3: | $E_3^2 = (\epsilon_3)^2 + (5*\epsilon_0/8)^2 + (\epsilon_2/2)^2 + (3*\epsilon_4/4)^2 + (3*\epsilon_8/8)^2$ |
| 5: | $E_5^2 = (\epsilon_5)^2 + (3*\epsilon_0/8)^2 + (3*\epsilon_4/4)^2 + (\epsilon_6/2)^2 + (5*\epsilon_8/8)^2$ |
| 7: | $E_7^2 = (\epsilon_7)^2 + (\epsilon_0/8)^2 + (\epsilon_4/4)^2 + (\epsilon_6/2)^2 + (7*\epsilon_8/8)^2$ |

It is interesting to note that, unlike the 'P' prediction method, the sum of the noise components can be arranged to be a constant independent of frame number provided the noise components $\epsilon_4$, $\epsilon_2$, $\epsilon_6$, $\epsilon_1$, $\epsilon_3$, $\epsilon_5$, $\epsilon_7$ are adjusted through the quantization control in the following way:

For $E_4 = E_0 = E_8 = \epsilon$, $$\epsilon_4 = \sqrt{(\epsilon^2 - (\epsilon/2)^2 - (\epsilon/2)^2)} = 0.7071*\epsilon \quad (= \sqrt{0.5}\ *\epsilon)$$

Now that $E_4 = \epsilon$, and setting, $E_2 = E_6 = \epsilon$ gives $$\epsilon_2 = \sqrt{(\epsilon^2 - (3*\epsilon/4)^2 - ((0.7071*\epsilon)/2)^2 - (\epsilon/4)^2)} = 0.5*\epsilon$$

$$\epsilon_6 = \sqrt{(\epsilon^2 - (3*\epsilon/4)^2 - ((0.7071*\epsilon)/2)^2 - (3*\epsilon/4)^2)} = 0.5*\epsilon$$

and setting $E_1 = E_3 = E_5 = E_7 = \epsilon$ gives $$\epsilon_1 = \sqrt{(\epsilon^2 - (7*\epsilon/8)^2 - ((0.5*\epsilon)/2)^2 - (0.7071*\epsilon/4)^2 - (\epsilon/8))} = 0.3536*\epsilon \quad (= \sqrt{0.125}\ *\epsilon)$$

$$\epsilon_3 = \sqrt{(\epsilon^2 - (5*\epsilon/8)^2 - ((0.5*\epsilon)/2)^2 - (0.7071*3*\epsilon/4)^2 - (3*\epsilon/8))} = 0.3536*\epsilon$$

$$\epsilon_5 = \sqrt{(\epsilon^2 - (3*\epsilon/8)^2 - (0.7071*3*\epsilon/4)^2 - ((0.5*\epsilon/2)^2 - (5*\epsilon/8))} = 0.3536*\epsilon$$

$$\epsilon_7 = \sqrt{(\epsilon^2 - (\epsilon/8)^2 - (0.7071*\epsilon/4)^2 - ((0.5*\epsilon/2)^2 - (7*\epsilon/8))} = 0.3536*\epsilon$$

There is clearly a relationship between the temporal decimation stage and the noise component such that a noise reduction by $\sqrt{(0.5)}$ at each additional stage ensures a constant noise component in each frame. However, the requirement for reducing quantization noise for higher temporal frequency bands obviously reduces coding efficiency and this has to be matched against the recursive noise addition of the closed loop encoder.

This system of noise weightings has been implemented and the noise values are close to that of the closed loop system for several systems. Reconstruction error measurements indicate <1 dB difference in system noise performance. Sometimes the noise in closed loop operation is higher than open loop encoding, sometimes smaller. However, as noted many times, the measurement of reconstruction error in a simple S/N value can be misleading. Viewing tests conducted using both methods clearly indicate that the errors of the type introduced by the open loop encoding process are far less objectionable than those from the closed loop system. The reason appears to be the nature of the noise components. As already made clear, the closed loop encoder results in noise which is largely independent and persists for 1 frame only. The open loop encoder produces errors in various components, some of which persist for 1 frame only, whereas some fade in and out over several frames. It seems that the eyes' temporal response is such that flickering types of distortions are more readily visible than slow changing errors. Anecdotal evidence shows up the effect as follows: when a picture is in still-frame mode some of the errors are not visible until the sequence is played at normal speed; then these otherwise invisible 'static' errors become visible.

The characteristic of the noise components for both closed-loop and open-loop encoding methods are shown in Table 1 below:

1-level, 2-frame; 2-level, 4-frame; 3-level, 8-frame (as shown); 4-level, 16-frame and so on.

Figure 5:
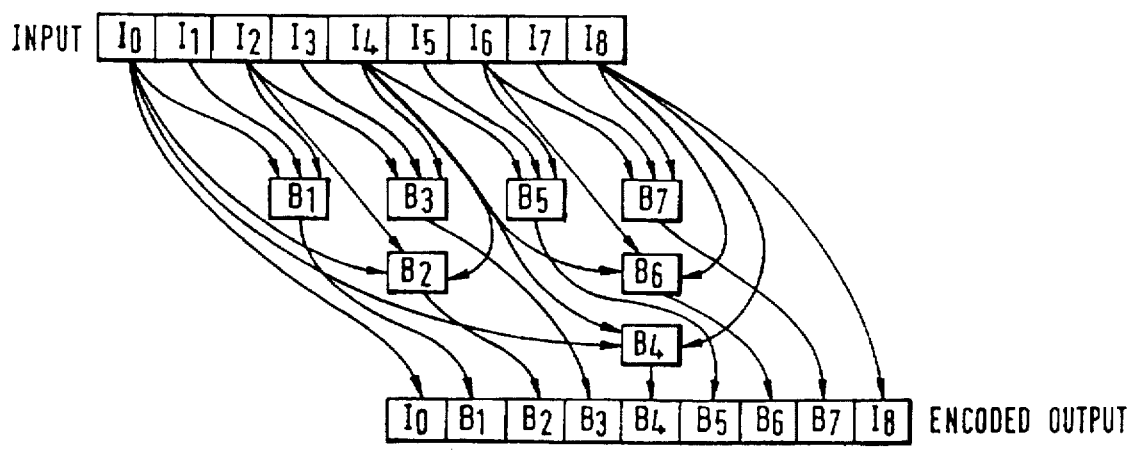
FIG. 5 is an encoder timing diagram showing the timing on a frame-by-frame basis.

FIG. 5 illustrates the encoder timing on a frame-by-frame basis.

FIG. 5 shows that the use of open-loop encoding considerably simplifies the system architecture and reduces the number of delay elements required in both encoding and decoding. The diagram ignores the requirement for vector offsets used in motion vector estimation and compensation, but since the timing is based on a per-frame basis, such offsets should not cause a problem. The normal delay of the encoder is 5-frames, as can be seen from FIG. 5.

Figure 6A:
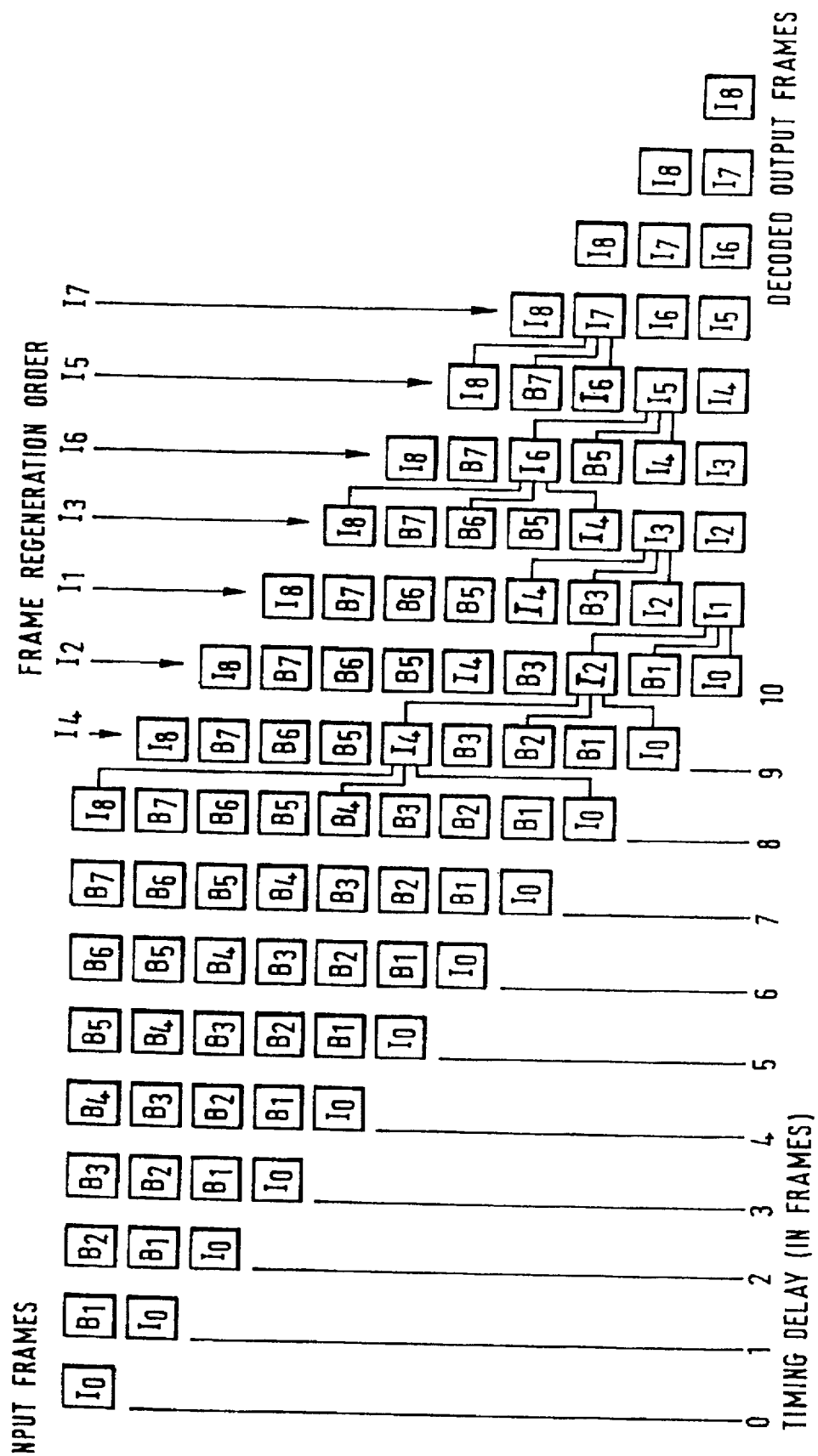
FIG. 6a is a decoder timing diagram for a known type of decoder.
Figure 6B:
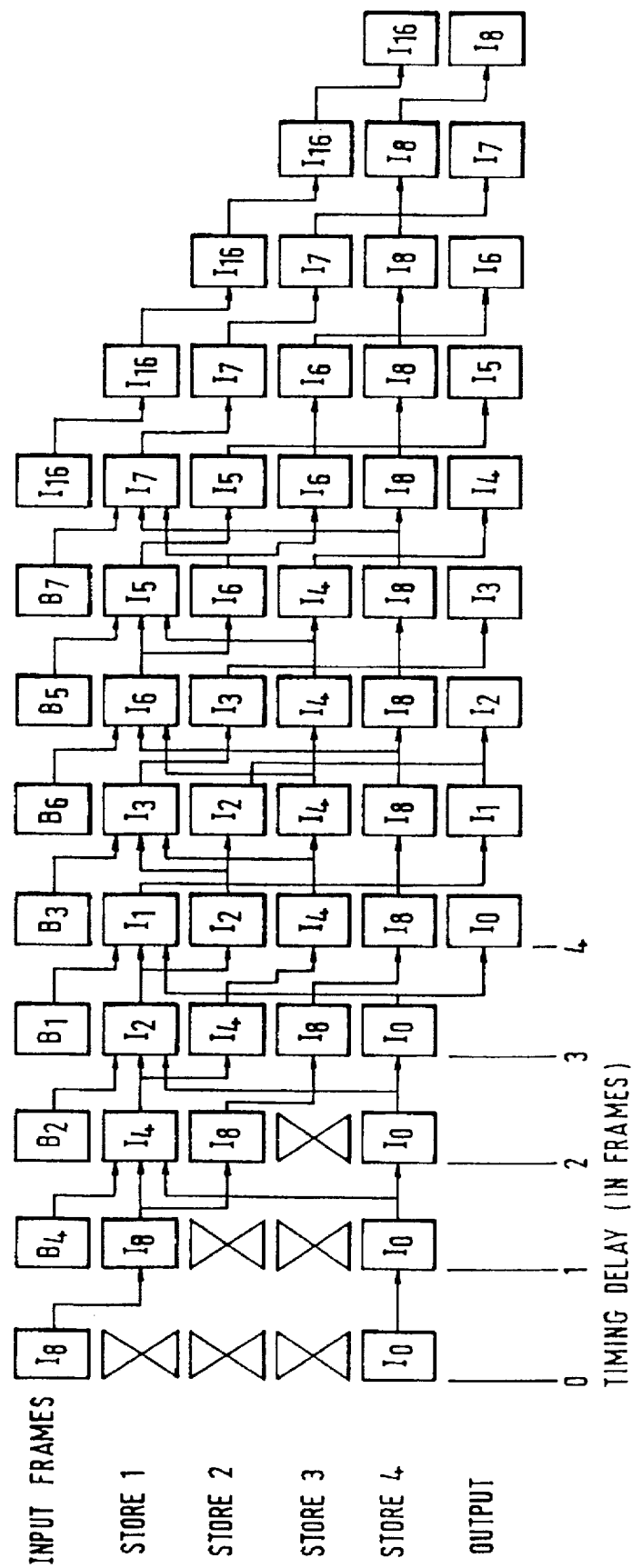
FIG. 6b is a decoder timing diagram for a reduced timing delay decoder.

FIG. 6a illustrates the timing diagram of a decoder using a conventional decoding scheme. The normal delay of the decoder is 10 frames, the decoder using 10 frames of memory which may be regarded as high. However, this can be reduced to 4 frames by adding an 8 frame delay to the 'I' frames and reordering the 'B' frame sequence in the encoder as shown in FIG. 6b. Due to the removal of the feedback loop in the encoder, the 'B' frames can be generated in any order required. However, the decoder does require a particular order of operation to recover the original frames correctly. Namely, the $I_4$ frame must be decoded before the $I_2$ and $I_6$ frames, and the $I_2$ and $I_6$ frames must be decoded before the $I_1$, $I_3$, $I_5$ and $I_7$ frames. However, this is a simple requirement which can easily be met.

Both encoder and decoder delays can be further reduced but at the expense of inherent simplicity so this is not described.

The use of 'B' frame prediction is usually an improvement over 'P' frames since the prediction error is reduced, classically by about 3 dB.

The frames can be re-ordered in temporal significance (either literally or symbolically) to the following order:

TABLE 1

Noise Power Components for the Open Loop Encoder

| Error | Scaling | F0 | F1 | F2 | F3 | F4 | F5 | F6 | F7 | F8 |
|---|---|---|---|---|---|---|---|---|---|---|
| $\epsilon_0$ | 1.0 | 1.0 | 0.766 | 0.562 | 0.391 | 0.25 | 0.141 | 0.062 | 0.016 | 0.0 |
| $\epsilon_1$ | 0.125 | 0.0 | 0.125 | 0.0 | 0.0 | 0.0 | 0.0 | 0.0 | 0.0 | 0.0 |
| $\epsilon_2$ | 0.25 | 0.0 | 0.062 | 0.25 | 0.062 | 0.0 | 0.0 | 0.0 | 0.0 | 0.0 |
| $\epsilon_3$ | 0.125 | 0.0 | 0.0 | 0.0 | 0.125 | 0.0 | 0.0 | 0.0 | 0.0 | 0.0 |
| $\epsilon_4$ | 0.5 | 0.0 | 0.031 | 0.125 | 0.281 | 0.5 | 0.281 | 0.125 | 0.031 | 0.0 |
| $\epsilon_5$ | 0.125 | 0.0 | 0.0 | 0.0 | 0.0 | 0.0 | 0.125 | 0.0 | 0.0 | 0.0 |
| $\epsilon_6$ | 0.25 | 0.0 | 0.0 | 0.0 | 0.0 | 0.0 | 0.062 | 0.25 | 0.062 | 0.0 |
| $\epsilon_7$ | 0.125 | 0.0 | 0.0 | 0.0 | 0.0 | 0.0 | 0.0 | 0.0 | 0.125 | 0.0 |
| $\epsilon_8$ | 1.0 | 0.0 | 0.016 | 0.062 | 0.141 | 0.25 | 0.391 | 0.562 | 0.766 | 1.0 |
| Power | Sum: | 1.0 | 1.0 | 1.0 | 1.0 | 1.0 | 1.0 | 1.0 | 1.0 | 1.0 |

Figure 4:
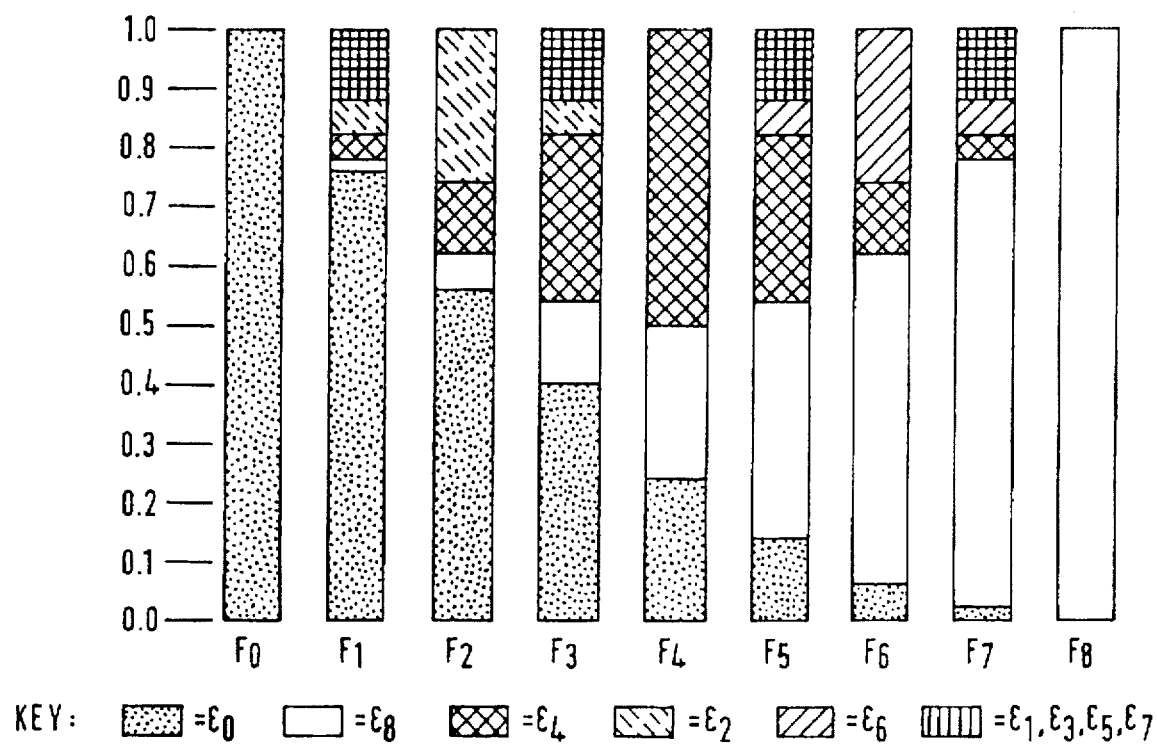
FIG. 4 is a pictorial representation of noise components of closed-loop and open-loop encoding systems.

A pictorial representation of the noise components is shown in FIG. 4.

As can be seen from Table 1 and FIG. 4, the components due to errors in the I frames $\epsilon_0$ and $\epsilon_8$ have the slowest fading errors, last 15 frames, and occupy a significant proportion of the overall error. Error $\epsilon_4$ fades in and out twice as fast extending over 7 frames. Errors $\epsilon_2$ and $\epsilon_6$ last only 3 frames each, and errors $\epsilon_1$, $\epsilon_3$, $\epsilon_5$ and $\epsilon_7$ only occur once during their respective frames. The shorter duration errors have the lowest magnitude.

The result is much more pleasing to the eye, and so is proposed for all applications using 'B' frame decimation. Although the error distribution is shown for 3-level temporal decimation of 8 frames, equivalent diagrams and underlying assumptions apply for any level of temporal decimation;

$I_0$ $B_4$ $B_2$ $B_6$ $B_1$ $B_3$ $B_5$ $B_7$ $(I_8)$

If the last 4 'B' frames are deleted, then the sequence will play out with an estimation of those frames, likewise, if frames $B_4$ and $B_2$ are deleted. The method therefore allows a reasonable picture sequence to be played in the absence of the higher order 'B' frames. Naturally, if all 'B' frames are deleted, then the replayed sequence will be severely perturbed, but with accurate motion vectors, the results can still be surprisingly good.

The method has been successfully used at data rates ranging from 20 Mbps down to 64 Kbps. However, so far, no direct comparison against the MPEG structure has been made although it is believed that the open loop coding method produces errors which are visually more acceptable.

The above-described method of temporally encoding video sequences has been demonstrated to give very good results at a range of data rates for a range of applications. The use of 'B' frames allows the technique of 'open-loop' encoding which produces similar reconstruction error values, but with much lower visibility leading to more pleasing picture quality. This is a significant development which is further enhanced by the knowledge that it is accomplished with a much simplified coding process. A conventional coder has to reconstruct the encoded signal to recover the signal which would be reconstructed in the receiver, whereas the open loop encoder has no such requirement. The hardware saving in the encoder (excluding motion vector estimation and compensation) is likely to be in the range of 30% to 50%.

The decoding of video sequences encoded with the logarithmic decimation process is necessarily longer than that for systems like MPEG1 using only forwards prediction with 'P' frames. However, it has been shown that a decoder can be considerably simplified by the redistribution of transmitted frames. This may be of lesser significance in a point to point transmission system, but becomes important in point to multi-point systems where encoder complexity is less significant than decoder complexity.

It should be noted that a 'B' frame system can form a subset of another system using both 'P' and 'B' prediction methods as in MPEG2. Therefore some of the 'B' frame techniques herein described can be valid for a subset implementation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A motion compensated video processing method, comprising the steps of:

selecting a number of video frames as 2 to the power of n where n is a positive integer, said number of video frames including a basic input video frame;

encoding said number of video frames by replacing a number of predetermined video frames therein by corresponding predictive frames, each of said corresponding predictive frames being calculated as a difference between the correspondingly replaced video frame and two neighboring video frames being located on either side of the correspondingly replaced video frame, one of said two neighboring video frames being selectively located in said number of video frames or in a subsequent number of video frames, such that the remaining video frames in said number of video frames are spaced apart from each other by twice a temporal distance as prior to said replacing step; and repeating said step of encoding until a group comprised of said basic input video frame and of a number of predictive frames is equal to said number of video frames.

2. The method according to claim 1, wherein said step of encoding comprises applying weighting to said number of predetermined video frames prior to selective summation.

3. The method according to claim 2, further comprising decoding said group by applying weighting to said number of predetermined video frames prior to selective summation in order to reconstruct the selected video frames.

4. The method according to claim 3, wherein said decoding is of open-loop type, and said weighting is applied by adjusting quantization values for reduced noise.

5. The method according to claim 1, further comprising decoding said group by applying weighting to said number of predetermined video frames prior to selective summation in order to reconstruct the selected video frames.

6. The method according to claim 5, wherein said decoding is of open-loop type, and said weighting is applied by adjusting quantization values for reduced noise.

* * * * *